Aug. 27, 1957  I. R. ASHLEY  2,803,998
APPROACHING VEHICLE INDICATOR
Filed Jan. 5, 1953  2 Sheets-Sheet 1
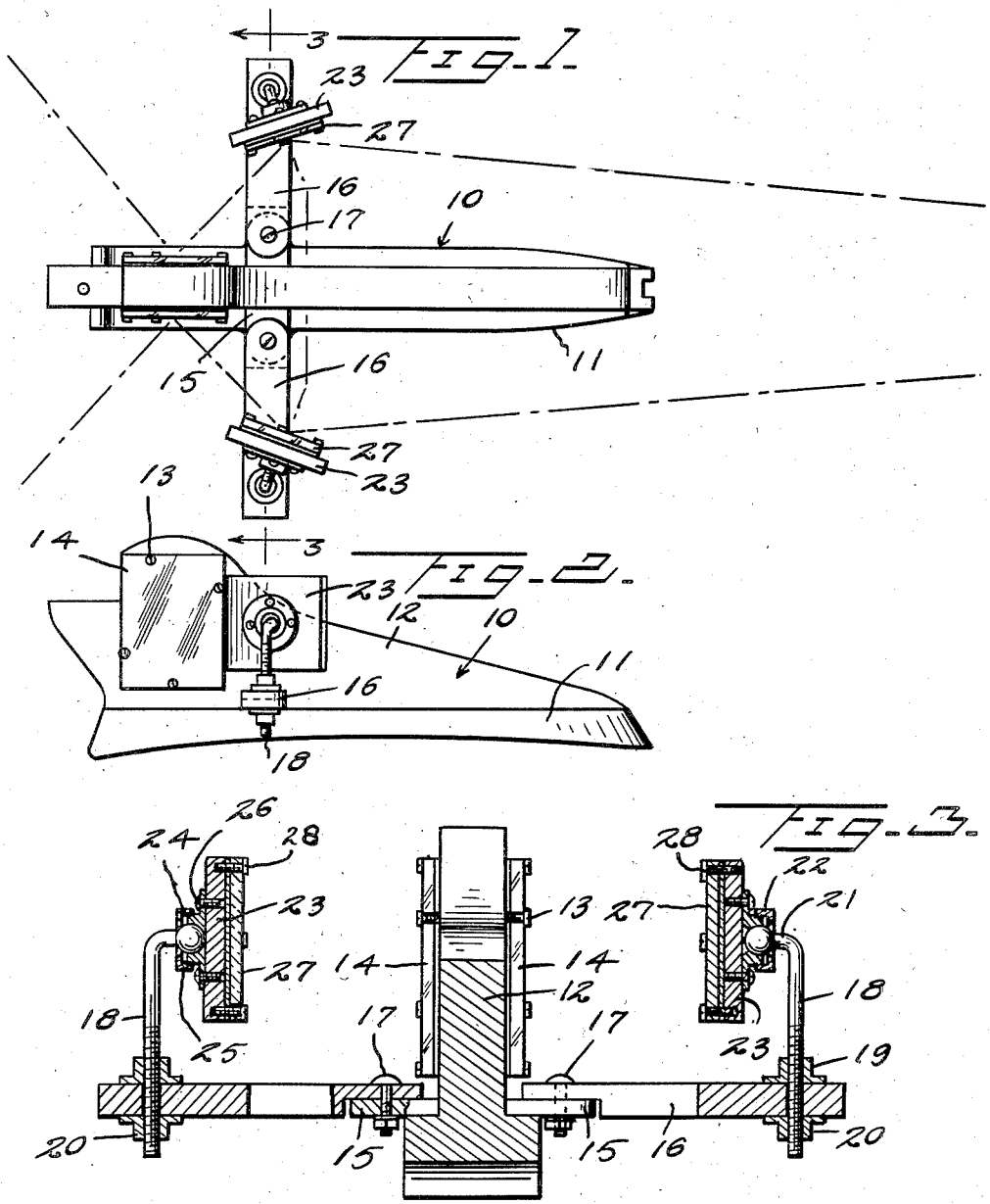
INVENTOR
Ira R. Ashley
BY Kimmel & Crowell
ATTORNEYS Aug. 27, 1957   I. R. ASHLEY   2,803,998
APPROACHING VEHICLE INDICATOR
Filed Jan. 5, 1953   2 Sheets-Sheet 2
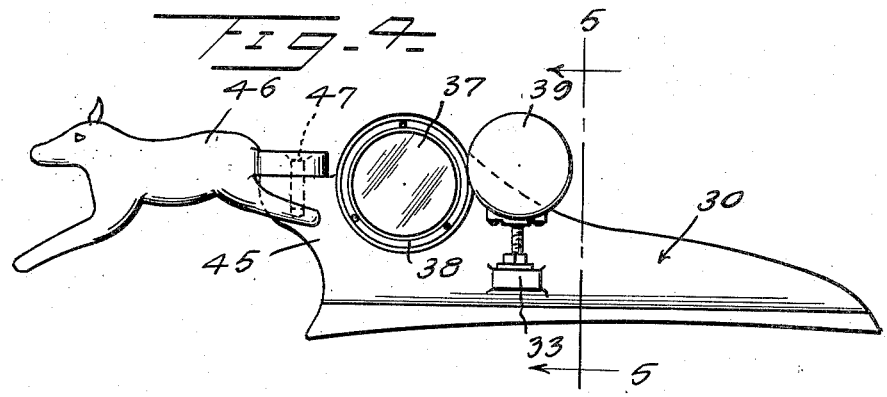
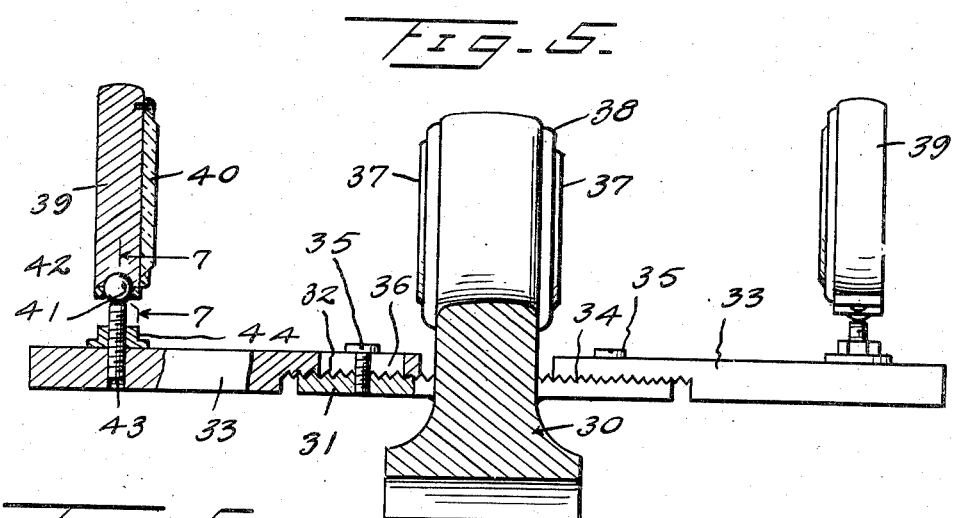
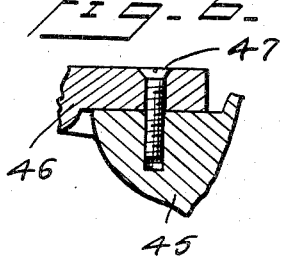
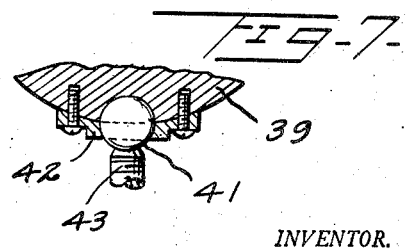
INVENTOR.
Ira R. Ashley
By
Kimmel & Crowell Attys.

United States Patent Office 2,803,998
Patented Aug. 27, 1957

2,803,998

APPROACHING VEHICLE INDICATOR

Ira R. Ashley, Lumberton, N. C.

Application January 5, 1953, Serial No. 329,559

1 Claim. (Cl. 88—86)

This invention relates to an indicator for vehicles approaching from a cross street.

In the operation of a motor vehicle it frequently happens that at a crossing point of two streets it is practically impossible for a driver to see a vehicle approaching from either the right or left due to obstructions on either or both sides of the road. Such obstructions make it necessary for a vehicle to at least partially enter the crossing and thereby partially intersect the line of travel of the other vehicle.

It is, therefore, an object of this invention to provide an attachment for mounting on the front portion of the vehicle hood whereby the driver may observe vehicles approaching the crossing from either side without moving his vehicle substantially into the crossing.

Another object of this invention is to provide a device of this kind which will be ornamental as well as serving a utilitarian purpose.

A further object of this invention is to provide a device of this kind which is simple in construction and can be readily mounted on various types of vehicles.

With the above and other objects in view, my invention consists in the arrangement, combination and details of construction disclosed in the drawing and specification, and then more particularly pointed out in the appended claim.

In the drawings—

Figure 1 is a plan view of a vehicle indicator constructed according to an embodiment of this invention, Figure 2 is a detailed side elevation of the device, Figure 3 is a sectional view taken on the line 3—3 of Figure 1, Figure 4 is a detailed side elevation of a modified form of this invention, Figure 5 is a sectional view taken on the line 5—5 of Figure 4, Figure 6 is a fragmentary vertical section showing the connection between the ornament and the vehicle indicator, Figure 7 is a fragmentary sectional view taken on the line 7—7 of Figure 5.

Referring to the drawings, the numeral 10 designates generally an elongated support which is formed of a base 11 adapted to be secured to the upper side and the front portion of the vehicle hood. The base 11 has extending upwardly therefrom a vertical member 12 which is preferably on ornamental lines so as to produce an ornamental attachment at the forward end of the hood.

The vertical member 12 has secured to the opposite vertical sides thereof a pair of reflecting members 14 which are secured to the member 12 by fastening devices 13. The vertical member 12 has extending from the opposite sides thereof lugs 15, and a pair of horizontally adjustable supporting arms 16 are secured by fastening devices 17 to the supporting lugs 15.

Each arm 16 has mounted on the outer portion thereof an upright bolt 18 which is secured to the arm 16 by means of upper and lower nuts 19 and 20 respectively. The upper end of the bolt 18 is formed with a right angular extension 21 and a ball 22 is carried by the extension 21. A reflector supporting plate 23 is secured to the ball 22 by means of a ball socket 24, and a locking nut 25. The ball socket 24 is secured to the plate 23 by fastening devices 26.

A reflector 27 is secured by fastening devices 28 to the inner side of the plate 23, and as shown in Figures 1 and 2, the arms 16 and the reflectors 27 carried thereby are disposed rearwardly of the vertical and stationary reflectors 14. The reflectors 27 are angularly adjusted with respect to the reflectors 14 so that the image appearing in the reflectors 14 will be reflected rearwardly to the driver of the vehicle.

The device hereinbefore described is adapted to be secured to the front end of the vehicle hood, and the reflectors 27 are then adjusted so that the driver of the vehicle will be able to view an approaching vehicle which approaches from either side. When the vehicle having this attachment approaches a crossing which, as is the case with a number of crossings, is a blind crossing, the forward end of the vehicle may be only partially moved into the crossing so that the image of any vehicles approaching from right angles to the instant vehicle may be reflected in the reflectors 14 and this image then reflected rearwardly by the reflectors 27 to the driver of the vehicle.

Referring now to Figures 4 to 7 inclusive, the numeral 30 designated generally a base similar to the base 11, which is adapted to be secured to the upper side and the front portion of a vehicle hood. The base 30 is formed with a pair of oppositely extending arms 31 formed with teeth 32 on the upper sides thereof. A pair of laterally projecting arms 33, having teeth 34 at their inner ends, are adapted to be secured to the arms 31 by fastening devices 35. The arms 33 are provided with an elongated slot 36 through which the fastening devices 35 engage so that the arms 35 may be extended or retracted with respect to the opposite sides of the base 30.

The base or support 30 has secured to the opposite vertical sides thereof reflecting members 37 which are secured to the base or support 30 by bezels 38. Each outer arm 33 has extending upwardly therefrom a reflector support 39 on which a reflector 40 is secured. The reflector support 39 is substantially disc-shaped and the reflector 40, as well as the reflectors 37, are also of disc shape.

The supports 39 are adjustably supported in a manner whereby the supports 39 may be angularly adjusted with respect to the reflecting members 37, by means of a ball member 41 engaging in a ball socket 42 carried by the support 39. The ball 41 is formed with a threaded stud 43 which is threaded into the supporting arm 33 and stud 43 is locked in vertically adjusted position by means of a lock nut 44.

The body or base 30 is provided at its forward end with a projection or lug 45 on which an ornament 46 may be secured by fastening means 47.

I do not mean to confine myself to the exact details of construction herein disclosed, but claim all variations falling within the purview of the appended claim.

What I claim is:

An approaching vehicle indicator comprising a vertically disposed supporting member adapted for mounting on a vehicle hood, a reflecting member fixed to each side of said supporting member at the forward end thereof, a second pair of reflecting members disposed in laterally and rearwardly spaced relation with respect to said first-named reflecting members, a pair of laterally projecting horizontal arms, means adjustably securing said arms to said supporting member for adjustment in a horizontal plane, an inverted L-shaped support carried by the outer end of each arm, and ball and socket means securing one member of each pair of reflecting members to one of said L-shaped supports whereby said pair of reflecting members may be angularly adjusted both horizontally and vertically relative to said first-named reflecting members.

References Cited in the file of this patent

UNITED STATES PATENTS

| | | |
|---|---|---|
| 1,338,738 | Kometter, Jr. | May 4, 1920 |
| 2,338,780 | Poncher et al. | Jan. 11, 1944 |

FOREIGN PATENTS

| | | |
|---|---|---|
| 380,146 | Great Britain | Sept. 15, 1932 |